United States Patent
Fiebig

(10) Patent No.: US 8,843,474 B2
(45) Date of Patent: Sep. 23, 2014

(54) METHOD AND DATABASE SYSTEM FOR EXECUTING A XML DATABASE QUERY

(75) Inventor: Thorsten Fiebig, Mannheim (DE)

(73) Assignee: Software AG, Darmstadt (DE)

( * ) Notice: Subject to any disclaimer, the term of this patent is extended or adjusted under 35 U.S.C. 154(b) by 1743 days.

(21) Appl. No.: 11/924,297

(22) Filed: Oct. 25, 2007

(65) Prior Publication Data

US 2008/0270371 A1 Oct. 30, 2008

(30) Foreign Application Priority Data

Apr. 27, 2007 (EP) .................................. 07008680

(51) Int. Cl.
*G06F 17/30* (2006.01)

(52) U.S. Cl.
CPC .............................. *G06F 17/30935* (2013.01)
USPC ........................................................ 707/718

(58) Field of Classification Search
USPC ........................................ 707/2, 3, 102, 718
See application file for complete search history.

(56) References Cited

U.S. PATENT DOCUMENTS

| 6,356,887 | B1 * | 3/2002 | Berenson et al. | 707/2 |
| 7,577,642 | B2 * | 8/2009 | Liu et al. | 707/3 |
| 2008/0120321 | A1 * | 5/2008 | Liu et al. | 707/102 |
| 2008/0222087 | A1 * | 9/2008 | Balmin et al. | 707/2 |

OTHER PUBLICATIONS

European Office Action for application No. EP 07008680.6, mailed Mar. 25, 2008.
Ives, et al.; "An Adaptive Query Execution System for Data Integration"; Proceedings of the ACM Special Interest Group on Management of Data 1999; Philadelphia, PA; pp. 299-310.
Ives, et al.; "Adaptive Query Processing for Internet Applications"; Bulletin of the IEEE Computer Society Technical Committee on Data Engineering; 2000; pp. 19-26.
European search report for application No. EP 07 00 8680, mailed Sep. 4, 2007.
McHugh, et al., "Query Optimization for XML", Very Large Databases, Proceedings of the Twenty-Fifth International Conference on Very Large Databases, Morgan Kaufmann Publishers, Orlando, Florida, 1999, pp. 315-326.
Jose De Aguiar Moares Filho, et al., "Statistics for Cost-Based XML Query Optimization", Workshop Uber Grundlagen von Datenbanken, 2006, 6 pages.
Wu, et al., "Estimating Answer Sizes for XML Queries", EDBT 2002, 2002, pp. 590-608.
Balmin, et al., "Cost-Based Optimization in DB2 XML", IBM Systems Journal, vol, 45, No. 2, 2006, 22 pages.

* cited by examiner

*Primary Examiner* — Apu Mofiz
*Assistant Examiner* — Chelcie Daye
(74) *Attorney, Agent, or Firm* — Meyertons Hood Kivlin Kowert & Goetzel, P.C.; Jeffrey C. Hood

(57) ABSTRACT

Executing a XML database query. The method may include compiling the XML database query to provide at least two alternative execution plans, wherein the at least two alternative execution plans provide the same response to the XML database query. The method may further include deciding during runtime, which of the at least two alternative execution plans is executed. The method may include executing the selected execution plan.

17 Claims, 3 Drawing Sheets

METHOD AND DATABASE SYSTEM FOR EXECUTING A XML DATABASE QUERY

PRIORITY CLAIM

Figure 1:
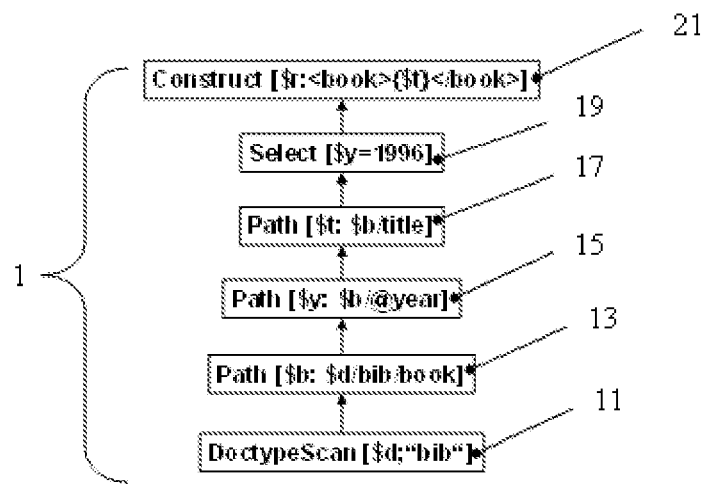

This application claims benefit of priority of European application no. 07 008 680.6 titled "Method and Database System for Executing a XML Database Query", filed Apr. 27, 2007, and whose inventor is Thorsten Fiebig.

INCORPORATED BY REFERENCE

European application no. 07 008 680.6 titled "Method and Database System for Executing a XML Database Query", filed Apr. 27, 2007, and whose inventor is Thorsten Fiebig, is hereby incorporated by reference in its entirety as though fully and completely set forth herein.

TECHNICAL FIELD

The present invention relates to a method and a database system for executing a XML database query.

DESCRIPTION OF THE RELATED ART

Due to their flexibility, XML databases are becoming more and more important technical tools of modern information societies. The efficient retrieval of XML data in response to a XML database query is the primary purpose of almost any database system which operates on a XML data base.

Following the common query processing approach in an XML data base management system, a query is at first compiled. The compilation of a query includes parsing, semantic checks and optimization. In a XML database management system like the Tamino XML server of applicant, the result of the compilation is a query execution plan that specifies how the query result can be obtained from the stored data. The query execution plan is defined in terms of operations that are eventually performed by the query execution engine. The operations include database access operations, filer operations as well as XML query specific operations.

In the art of XML data bases, it is known to optimize a query execution plan to improve the efficiency of the processing and to provide a response to the query as fast as possible and with the lowest amount of processing and network traffic involved. To this end, a database management system may maintain statistical information about the content of the database. Based on this information, a query processor is able to determine how efficient it is to execute a certain query execution plan. Using the statistics, a query processor is able to select the optimal query execution plan from multiple alternatives during compile time.

However, such an optimization strategy for the fastest and most efficient processing of a database query does not always work. This applies in particular in cases where not all relevant information is known during the compilation, e.g., if a query depends on a parameter. Additionally, databases statistics cannot be updated whenever data is modified, deleted or inserted. This would lead unacceptable response times when modifying, deleting or inserting data.

U.S. Pat. No. 7,051,034 discloses the execution of a query execution plan, comprising several restartable sub-trees. During execution it is dynamically decided, whether it is preferable to execute the same sub-tree using a single server process or multiple parallel server processes.

US Publication No. 2003/0208484 A1 relates to searches for multimedia data, for example images, in huge databases, wherein it is impossible to perform an exhaustive search in a realistically given response time. US Publication No. 2003/0208484 A1 teaches evaluation of different combinations of access plans, wherein the numbers of search features are different, and selection of the plan having the lowest associated "costs". However, varying the number of search features will affect the results of the different access plans so that the response to a given query will be different depending on the access plan. This might be acceptable where it is impossible to perform an exhaustive search over the whole data repository so that any response will always be a kind of educated guess. However, if the database is not excessively large, it is important that a query provides consistent results, regardless of the strategy used for its execution.

Further examples of query execution plans for general databases are disclosed in the U.S. Pat. No. 5,335,345 and WO 2005/083587. However, none of the above mentioned prior art documents concerns queries on a XML database. The great amount of flexibility provided by the XML data model, however, leads to a significantly greater amount of the complexity of the respective XML database queries so that approaches known from standard data bases cannot be easily applied.

Correspondingly, improvements in XML queries are desired.

SUMMARY OF THE INVENTION

Various embodiments are presented of a method for executing an XML database query. The method may include compiling the XML database query to provide at least two alternative execution plans providing upon execution the same response to the XML database query; deciding during runtime, which of the at least two alternative execution plans is executed; and executing the selected execution plan.

As can be seen, there is not a single query execution plan for the XML query but rather two or more alternatives. It is to be noted that the various query execution plans to not have to be fully separate but may have one or more common operations. During runtime, when the query is to be executed and all (possible) input parameters may be bound to values, the "cost" of the alternatives may be assessed, i.e. the integral of their processing time, number of steps, network accesses etc. In one embodiment, the assessment may be performed depending on intermediate results obtained during execution of the XML database query. Subsequently, the most effective plan may be executed. Such a dynamic XML query optimization substantially improves the efficiency of the overall database access but assures at the same time that the results are consistent regardless of the optimization of the query execution.

In addition to performing such a dynamic selection during runtime, the described method may involve the use of XML database statistics, thereby improving the query execution both, during runtime and during compile time.

A dynamic XML query execution may be particularly important where the at least two execution plans differ by the use of at least one XML database index. The efficiency gain obtained by using an index largely may depend on the content of the XML data to which the index relates. Therefore, it may in some cases be more efficient to use the XML database index, whereas in other cases it may be more efficient not to use the XML database index and to directly operate on the elements in the XML database.

The described method may be particularly useful for database queries serving for text retrieval and/or sort queries. In the case of text retrieval, for which XML databases are particularly suitable, the choice of the execution plan may be made depending on the results of a scan for the text to be retrieved. In the case of a XML sort query, the at least two execution plans may both include a sorting step but may differ in the sequence in which the sorting step and other steps of the respective execution plan are executed.

Further modifications of the described method are envisioned.

In some embodiments, the method described above may be implemented by a database system. For example, the database system may include a compiler adapted to generate at least two database query execution plans providing upon execution the same response to the database query; at least one switch adapted to select one of the at least two database query execution plans during runtime; and an execution engine adapted to execute the selected execution plan.

The switch may be, in one embodiment, adapted to select one of the at least two alternative execution plans depending on intermediate results obtained during execution of the database query. Accordingly, the dynamic switch may enable the dynamic optimization of the XML query execution by switching between two execution plans, which provide the same result, but which may for a certain XML query substantially differ with respect to the time and efficiency of the query processing.

Finally, the method described above may be implemented according to a computer program and a memory medium comprising such a program with instructions which are executable by a processor.

SHORT DESCRIPTION OF THE DRAWINGS

Figure 2:
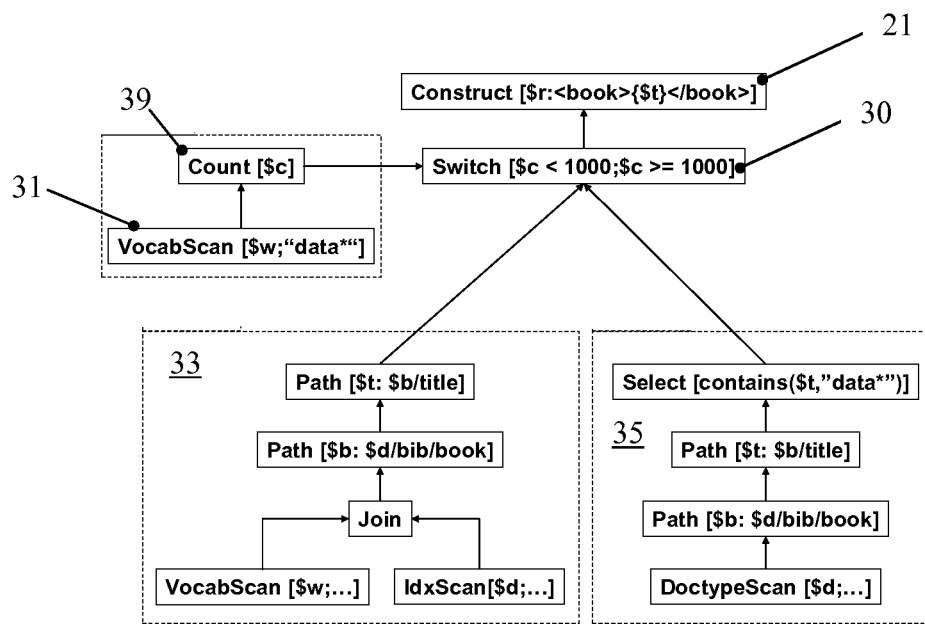
Figure 3:
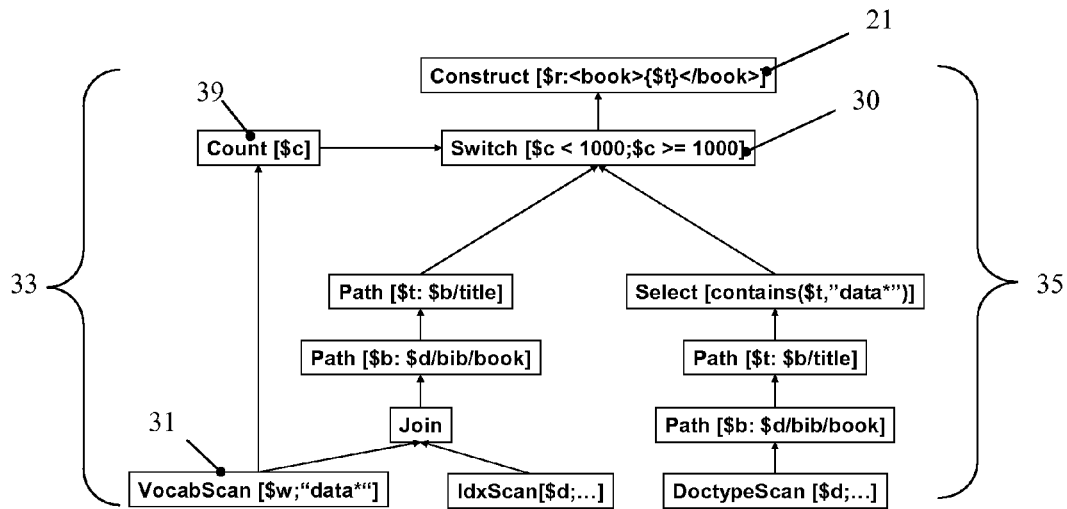
Figure 4:
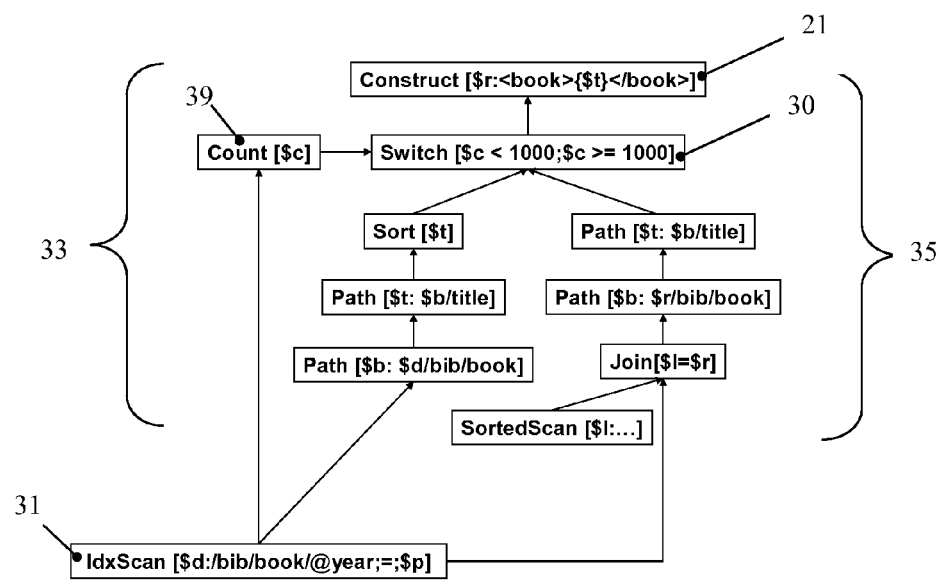

In the following detailed description, presently preferred embodiments of the invention are further described with reference to the following figures:

FIG. 1: An example of an operator tree that visualizes a XML query execution plan;

FIG. 2: An example of two query execution plans combined with a dynamic switch for a text retrieval query according to an embodiment of the invention;

FIG. 3: An optimized alternative of the embodiment of FIG. 2 with a factorized common sub-expression;

FIG. 4: A further embodiment of two query execution plans for a parameterized sort XML query and a dynamic switch linking the two plans; and FIG. 5: An optimized alternative of the embodiment of FIG. 4, wherein the dynamic switch passes the probe input to the final result construction.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

In the following, preferred embodiments of the invention are described with reference to the algebraic processing of XML queries. However, the present invention can also be realized in different ways and the following examples are not to be construed as limiting the present invention to a specific implementation of the claimed method and database system.

Algebraic query processing is based on an operator set that reflects the capabilities of the underlying query execution engine. The operators consume and produce ordered tuple lists. Each tuple entry contains a piece of data that has for example been read from an index, extracted from a document or determined by applying a math formula. These tuple entries are called variable bindings. The tuples lists exchanged by the operators are called table structures.

The following exemplary query is expressed in the syntax of the XML query specification, which is proposed by the W3C. The query acts on XML data representing bibliographic data. It looks for books published in 1996 and returns their titles:

```
for $b in input( )/bib/book
let $t := $b/title
let $y := $b/@year
where $y = 1996
return <book>{$t}</book>
```

The first line of the query iterates over all documents stored in the given collection of XML documents. It extracts the contained book elements by applying a simple path expression and binds the extracted elements to the variable $b. The next line binds the variable $t to the title contained in the book element that has been bound to variable $b. The next line binds the variable $y to the year attribute. The for and the two let clauses produce a tuple for each book element. The generated tuples have three entries holding the bindings for the variables $b, $t and $y. The tuple list is filtered by the where clause. Only those tuples pass the filter that have an attribute bound to $y that contains a value that is equal to 1996. The last line of the query holds a return clause that produces a book element for each filtered tuple. Each generated element contains a title of a selected book.

The algebraic expression that results form translating the query is shown by the operator tree 1 of FIG. 1. Operator tree means that the operators of the algebraic expression are represented as nodes. Each operator may consume the result of its input operator and may produce a result that can be consumed by any other operator. The directed edges of the operator tree may visualize the data flow between the operators. Operators that do not consume any input may be referred to as scan operators. Scan operators may be responsible for reading documents from the disk or accessing an index that has been defined on the documents for efficient retrieval.

The example operator tree contains a doctypeScan operator 11. It scans all documents belonging to the doctype bib. The documents may be bound to the variable $d. This means the operator may produce a tuple for each document in the doctype. The tuples may just have a single entry holding the complete document. The following path operator 13 may extract the book elements from the scanned documents and binds them to the variable $b. The subscript of a path operator may include the output variable and a restricted XQuery path expression. A path operator may evaluate the path expression for each tuple of the input table structure and may bind the output variable to the resulting XML fragments. The next two path operators 15, 17 may extract from each book element the year attribute and the title element. The result of the doctypeScan and the path operators may be a table structure with the variables $d, $b, $y and $t.

The resulting table structure may be filtered by a select operator 19 by applying the filter predicate of its subscript on each input tuple. In this example only those tuples may be passed that have a $y variable that is bound to a year attribute with a value equal to 1996. The filter predicate of a select operator can be an arbitrary Boolean XQuery expression. The filtered table structure may be consumed by a construct operator 21 that creates a book element for each input tuple. Its content is taken from the binding of variable $t.

The translated query may be the input for the actual query optimization. Although an operator tree may give a nice visualization of an algebraic expression, it may not be very useful for describing algebraic transformations. Therefore, a more concise textual representation may be used in the following that looks for the given algebraic expression like this:

```
Construct [$r:<book>{$t}</book>] (
    Select [$y=1996] (
        Path [$t: $b/title] (
            Path [$y: $b/@year] (
                Path [$b: $d/bib/book] (
                    DoctypeScan [$d;"bib"] ))))
```

The usage of indices may be essential for efficient query processing. This may reduce the amount of data that needs to be read from a disk for evaluating a query. Index access operators can be introduced by algebraic rewriting. Assuming there is an index on the year attribute, the above examplary query can be optimized by introducing a corresponding index access operator. The resulting algebraic expression may be:

```
Construct [$r:<book>{$t}</book>](
    Select [$y = 1996](
        Path [$t:$b/title](
            Path [$y:$b/@year](
                Path [$b:$d/bib/book](
                    IdxScan [$d;/bib/book/@year;=;1996])))))
```

The IdxScan may deliver the documents containing books published in 1996. The advantage is that only those documents have to be read from disk that fulfill the given search predicate. In case of big databases with many documents, this may lead to tremendous performance improvement if the database not just contains documents published in 1996.

Since the delivered documents match the given search criteria, further rewriting can be done. The effect may not be so dramatic but may lead to further performance improvements. The possible rewriting may result in the removal the unnecessary select operator. By removing the select operator, the path operator that creates the binding for the variable $y may be no longer required. After removal of the select and the path operator, the resulting optimized algebraic expression results:

```
Construct [$r:<book>{$t}</book>](
    Path [$t:$b/title](
        Path [$b:$d/bib/book](
            IdxScan [$d;/bib/book/@year;=;1996])))
```

Using an index may not always be the optimal query execution strategy. This can be shown by slightly modifying the above exemplary query. Instead of retrieving books that were published in a certain year a query may be defined that finds books published after 1996:

```
for $b in input( )/bib/book
let $t := $b/title
let $y := $b/@year
where $y > 1996
return <book>{$t}</book>
```

The default strategy for evaluating this query is to access an index defined on the year attribute. But this can be suboptimal if the search predicate matches more than a certain percentage of all searched documents. If the doctype operator only provides books published after 1996, searching the index may not give any performance advantage. Even worse, scanning the complete index can be much slower than just scanning the whole library and returning the books to get the query result.

This is also true if not all books fulfill the given search predicate. Up to a certain percentage of matching books, the best strategy may not be to access the index. The percentage depends on the database system. A rule of thumb is that if more than every second document matches the given search predicate the index is of no use.

As a result, there are two alternatives for processing the above defined very simple search query. First, accessing the index defined on the year attribute and second, processing the query without accessing the index. To choose the optimal alternative the optimizer needs to know how many documents fulfill the given search predicate. This kind of information can be obtained from statistics over the database content. For this example, the database management system needs to know about the distribution of the year attribute values.

If an optimal query execution plan is chosen during query compilation the optimization is static. Static optimization does not work properly if not all relevant information is known during the compilation of a query. When embedded in an application queries are pre-compiled and executed multiples times with different input parameters. The following query gives an example:

```
declare variable $p external;
for      $b in input( )/bib/book
let $t := $b/title
let $y := $b/@year
where $y > $p
return <book>{$t}</book>
```

The query declares an external variable to pass a value to the search predicate. The advantage is that it can be compiled and optimized only once and executed multiples time with different search values. This saves a lot of overhead compared to a complete re-compilation whenever a query is executed. On the other hand during the pre-compilation the query processor does not have enough knowledge to select the optimal query execution plan, because it does not know how many documents will fulfill the given search predicates. Even if database statistics are available, this is not possible due to the missing value of the query parameter.

The problem can be solved by dynamic query optimization. The query processor may make only those decisions that can be done with the available information. In other words, the query processor may not generate a single query execution plan. Instead, it may generate a plurality of alternative execution plans. When the query is executed, all input parameters may be bound to a value. Based on runtime information, the query processor may be able to determine the "costs" of the given alternatives based on the database statistics. After that it can choose the most efficient plan for execution.

Dynamic query optimization may still rely on database statistics, but for certain query operations statistics are not possible or difficult to determine. Additionally, databases statistics can not be updated whenever data is modified, deleted or inserted. This may lead to unacceptable response times when modifying, deleting or inserting data. In some embodiments, dynamic switches in query execution plans can be used for query optimization during query execution. The selection of alternatives may be based on intermediate query results and only optionally also on database statistics. Using a dynamic switch, at least a certain amount of optimization can be done even for parameterized queries.

An important query type is a text-retrieval query with a wildcard. Albeit very powerful, wildcard queries are hard to optimize and it may be quite challenging to maintain meaningful statistics. An example for a wildcard query is provided by the following query:

```
for $b in input( )/bib/book
let $t := $b/title
where contains($t,"data*")
return <book>{$t}</book>
```

The query finds books that contain a word starting with the term "data" in their title. Therefore, the query features a where clause applying a predicate with the search pattern "data*" that matches all words starting with "data".

A common indexing strategy for text-retrieval queries uses inverted lists. An inverted list maps a word to those documents that contain the word. In order limit their size inverted lists do not contain words but ids. These are created by a vocabulary that maps all words contained in the given database to a unique id. In this scenario wildcard query processing may be done in two steps: First, the wildcard search pattern may be matched against the vocabulary and second, for each of the matching vocabulary entries the containing documents may be retrieved via the inverted list. The according algebraic expression that gives the result for the example query looks like this:

```
Construct [$r:<book>{$t}</book>](
    Path [$t:$b/title](
        Path [$b:$d/bib/book](
            Join(
                VocabScan [$w;"data*"],
                IdxScan [$d;/bib/book/title; contains; $w])))
```

First the VocabScan may determine the IDs of the matching words. These may be bound to variable $w, which is the input for the IdxScan that finds those documents which have book elements with a title containing the corresponding word. This approach has a good performance if the number of matching vocabulary entries is small. If the number is above a certain threshold, it is much faster just to scan the documents and matching the wildcard search pattern directly on the scanned documents. The according algebraic expression looks like this:

```
Construct [$r:<book>{$t}</book>] (
    Select [contains($t,"word*")] (
        Path [$t: $b/title] (
            Path [$b: $d/bib/book] (
                DoctypeScan [$d;"bib"] ))))
```

Due to the complexity of wildcard search patterns, there are no statistics that give the number of matching words and the optimal query execution plan can not be selected. The problem can be solved by applying a dynamic switch. The dynamic switch may select an alternative in the query execution plan based on an intermediate result. In this example the intermediate result may be the number of matching words that are determined by scanning the vocabulary. If the number is below a certain threshold, the first alternative may be selected, otherwise the second one. The algebraic expression with the dynamic switch is illustrated in FIG. 2.

The dynamic switch of FIG. 2 is a true extension of the given operator set of the query execution engine. A dynamic switch operator may have a probe input and an arbitrary number of input alternatives. During query execution the probe input may be evaluated and the result is used to choose between the given alternatives, which return the same result. The result of the chosen alternative may be passed by the switch operator to any possible consumer. Once the dynamic switch has selected an input alternative the decision can not be reversed.

The switch operator 30 in the example of FIG. 2 has beside the probe input two alternative inputs 33 and 35. The probe input expression may count the number of matching vocabulary entries and binds the result to variable $c. The switch operator 30 may check the value of $c. If it is below 1000 it may read the result from the input 33 and may pass it to the construct operator 21 that creates the final result. If $c is greater or equal than 1000, it may read the result from alternative input 35.

By doing some factorization, the above overall execution plan be can be optimized. Instead of scanning the vocabulary twice, probe input and the alternative 33 can share the result of the vocabulary scan 31. The optimized algebraic expression is shown in FIG. 3. FIG. 3 illustrates how an intermediate result can be used to trigger an optimization with limited overhead. The required overhead is minimized by reusing the collected data for evaluating the query result. Since the information for the optimization is collected during query execution, the dynamic switch approach works perfectly for parameterized queries.

Dynamic switches can also be helpful to optimize parameterized sorting XML queries. The following XML query delivers a list of books that are published in a certain year. The books are sorted according to their title. The publication year is passed as a parameter:

```
declare variable $p external;
for     $b in input( )/bib/book
let $t := $b/title
let $y := $b/@year
where $y = $p
order by $t
return <book>{$t}</book>
```

Similar to the above described text-retrieval query, depending on the number of resulting books multiple processing strategies are possible. If the number is small, an index lookup with a subsequent sort operation seems to be the best choice. If the number is above a certain threshold it makes sense just to scan the complete database in a sorted manner and filter the scan result. A corresponding set of two query execution plans linked by a dynamic switch is shown in FIG. 4. As can be seen, it may select an optimal alternative depending on the number of books that need to be sorted:

The probe input of the switch operator 30 may determine the number of matching books. Depending on the number, the switch operator 30 may decide between two given alternatives 33, 35. If the number is less than 1000, it may be faster to retrieve the books matching the search predicate via an index and doing the sort operation on the filtered book elements. Otherwise it may be faster to retrieve a sorted document order by scanning the index defined on the title element and joining the result with the result of scanning the index for getting the books matching the search predicate. In this case the result of the index lookup 31 for the probe input can be re-used for both input alternatives 33, 35 of the dynamic switch 30. This reduces the overhead of evaluating the probe input and selecting an input alternative during the query execution to a minimum.

The dynamic switch 30 may be especially beneficial if it is providing the result of the probe input to the result of the selected input alternative 33. This is very helpful when optimizing a very common pattern in XML query processing. The following query gives an example. It returns an element holding books published in a certain year sorted by their title. Moreover, the element contains a count attribute holding the total number of published books:

```
declare variable $p external;
let $b := input( )/bib/book[@year = $p]
return
```

```
<result count="{count($b)}">
{
    for $x in $b
    order by $x/title
    return $x
}
</result>
```

Figure 5:
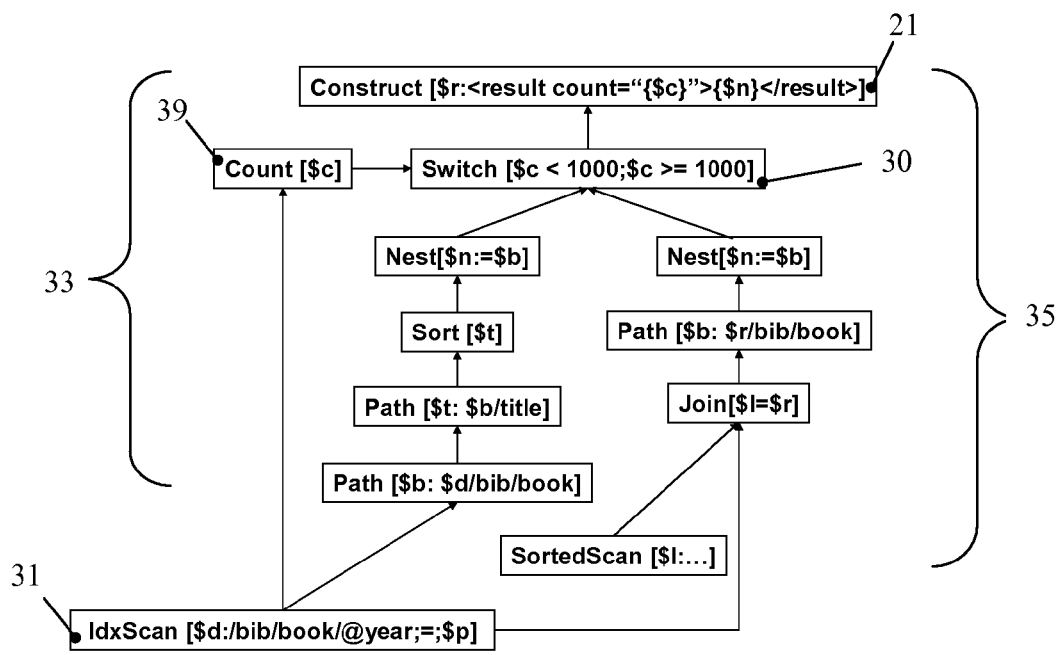

For processing this query the above query execution plan can be taken with some slight modifications, which are illustrated in FIG. 5:

On both input alternatives a nest operator 40 may be applied that collects the bindings of variable $b of all input tuples and assigns them to variable $n. The dynamic switch 30 may take result tuples of the selected input alternative and may add the variable $c 39 that is bound to the number of published books. From the binding of $c and $n the construct operator 21 may create the final result element. This example nicely shows how a dynamic switch 30 can perform query optimization during query execution with minimal overhead. All data that has been determined for the probe input is re-used for constructing the final query result.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for executing an extended markup language (XML) database query, the method comprising:
   compiling the XML database query to provide at least two alternative execution plans, wherein, upon execution, the at least two alternate execution plans provide a same response to the XML database query;
   selecting one of the at least two alternative execution plans at runtime; and
   executing the selected execution plan to perform the XML database query;
   wherein said selecting comprises a switch dynamically selecting one of the at least two alternative plans, wherein the switch performs the selection based on intermediate results, which are at least partly reused for evaluating the result of the execution of the XML database query according to at least one of the at least two alternative execution plans.

2. The method of claim 1, wherein said compiling involves the use of XML database statistics.

3. The method of claim 1, wherein the at least two execution plans differ by the use of at least one XML database index.

4. The method of claim 1, wherein the XML database query is dependent on at least one external parameter and pre-compiled without the parameter being bound to a value.

5. The method of claim 1, wherein the switch performs the selection based on intermediate results, all of which are used for the execution of the XML database query according to at least one of the at least two alternative execution plans.

6. The method of claim 1, wherein the intermediate results comprise the result of a count operation.

7. The method of claim 1, wherein the XML database query serves for text retrieval and wherein said selecting depends on results of a scan for the text to be retrieved.

8. The method of claim 1, wherein the XML database query involves a sort query and wherein the at least two execution plans both comprise a sorting step but differ in the sequence in which the sorting step and other steps of the respective execution plan are executed.

9. A computer accessible memory medium storing program instructions for executing a extended markup language (XML) database query, wherein the program instructions are executable by a processor implement:
   a compiler adapted to generate at least two database query execution plans, wherein upon execution the at least two alternate execution plans provide a same response to the XML database query; and
   at least one switch adapted to select one of the at least two database query execution plans during runtime; and
   an execution engine adapted to execute the selected execution plan;
   wherein said selecting comprises the at least one switch dynamically selecting one of the at least two alternative database query execution plans, wherein the switch performs the selection based on intermediate results, which are at least partly reused for evaluating the result of the execution of the XML database query according to at least one of the at least two alternative database query execution plans.

10. The computer accessible memory medium of claim 9, wherein the at least one switch is adapted to select one of the at least two alternative execution plans depending on at least one intermediate result obtained during execution of the XML database query.

11. The computer accessible memory medium of claim 9, wherein the memory medium stores XML database statistics adapted to be used by the compiler for generating the one or more alternative execution plans.

12. The computer accessible memory medium of claim 9, wherein the at least two execution plans differ by the use of at least one database index.

13. The computer accessible memory medium of claim 9, wherein the switch is adapted to select one of the at least two database query execution plans based on the result of an operator, which is also used in at least one of the two alternative execution plans.

14. A computer accessible memory medium storing program instructions for executing an extended markup language (XML) database query, wherein the program instructions are executable by a processor to:
   compile the XML database query to provide at least two alternative execution plans, wherein the at least two alternate execution plans provide a same response to the XML database query;
   select one of the at least two alternative execution plans at runtime; and
   execute the selected execution plan;
   wherein said selecting comprises dynamically selecting one of the at least two alternative plans, wherein the selection is performed based on intermediate results, which are at least partly reused for evaluating the result of the execution of the XML database query according to at least one of the at least two alternative execution plans.

15. The memory medium of claim 14, wherein said compiling involves the use of XML database statistics.

16. The memory medium of claim 14, wherein the at least two execution plans differ by the use of at least one XML database index.

17. The memory medium of claim 14, wherein the XML database query is dependent on at least one external parameter and pre-compiled without the parameter being bound to a value.

* * * * *